US008917993B2

(12) United States Patent
Timm et al.

(10) Patent No.: US 8,917,993 B2
(45) Date of Patent: Dec. 23, 2014

(54) SCHEDULING DELIVERY OF UPSTREAM TRAFFIC BASED ON DOWNSTREAM TRAFFIC IN OPTICAL NETWORKS

(75) Inventors: Steven L. Timm, Coon Rapids, MN (US); Mark R. Biegert, Maple Grove, MN (US)

(73) Assignee: Calix, Inc., Petaluma, CA (US)

( * ) Notice: Subject to any disclaimer, the term of this patent is extended or adjusted under 35 U.S.C. 154(b) by 60 days.

(21) Appl. No.: 13/163,114

(22) Filed: Jun. 17, 2011

(65) Prior Publication Data

US 2012/0321315 A1 Dec. 20, 2012

(51) Int. Cl.
*H04B 10/00* (2013.01)
*H04Q 11/00* (2006.01)

(52) U.S. Cl.
CPC ... *H04Q 11/0067* (2013.01); *H04Q 2011/0064* (2013.01)
USPC .............................................. 398/70; 398/71

(58) Field of Classification Search
USPC ..................................................... 398/66–73
See application file for complete search history.

(56) References Cited

U.S. PATENT DOCUMENTS

| 6,970,480 | B2 | 11/2005 | van Heyningen et al. | |
| 7,787,771 | B2 * | 8/2010 | Kim et al. ...................... | 398/68 |
| 7,983,308 | B1 | 7/2011 | Johnston et al. | |
| 7,986,879 | B2 | 7/2011 | Lee et al. | |
| 8,326,152 | B2 * | 12/2012 | Van Veen et al. ............. | 398/72 |
| 8,331,784 | B2 * | 12/2012 | Mizutani et al. .............. | 398/70 |
| 8,335,235 | B2 * | 12/2012 | Davis et al. ................... | 370/474 |
| 8,335,431 | B2 * | 12/2012 | Effenberger et al. ......... | 398/67 |
| 8,346,083 | B2 * | 1/2013 | Murayama et al. ........... | 398/72 |
| 2004/0208537 | A1 | 10/2004 | Lee et al. | |
| 2007/0147834 | A1 * | 6/2007 | Lai et al. ....................... | 398/69 |
| 2009/0317084 | A1 | 12/2009 | Kim et al. | |
| 2010/0129072 | A1 | 5/2010 | Yoshiuchi et al. | |
| 2011/0211837 | A1 * | 9/2011 | Sugawa et al. ................ | 398/67 |
| 2012/0148247 | A1 | 6/2012 | Skubic et al. | |
| 2012/0321312 | A1 * | 12/2012 | Timm et al. .................. | 398/66 |
| 2012/0321315 | A1 * | 12/2012 | Timm et al. .................. | 398/67 |

OTHER PUBLICATIONS

Office action for patent U.S. Appl. No. 13/163,074, mailed Sep. 5, 2013, 64 pages.
Response to office action for U.S. Appl. No. 13/163,074, filed Dec. 4, 2013, 26 pages.
Office Action from U.S. Appl. No. 13/163,074, dated Feb. 28, 2014, 27 pp.
Response to Office Action dated Feb. 28, 2014, from U.S. Appl. No. 13/163,074, filed Apr. 28, 2014, 8 pp.
Notice of Appeal from Office Action dated Feb. 28, 2014 from U.S. Appl. No. 13/163,074, filed Jun. 30, 2014, 1 pp.
Pre-Appeal Brief Request for Review from U.S. Appl. No. 13/163,074, filed Jun. 30, 2014, 5 pp.

* cited by examiner

*Primary Examiner* — Agustin Bello
(74) *Attorney, Agent, or Firm* — Shumaker & Siefert, P.A.

(57) ABSTRACT

In general, techniques are described for monitoring downstream traffic in order to schedule delivery of upstream traffic in a computer network. The techniques may be implemented by an optical line terminal (OLT) comprising a control unit and an interface. The control unit determines an amount of upstream data that is waiting at one of a plurality of ONTs to be transmitted upstream to the OLT, and determines an amount of downstream data that is transmitted by the OLT to this ONT. The control unit increases the determined amount of upstream data based on the determined amount of downstream data transmitted by the OLT to the ONTs and, after increasing the determined amount of upstream data, generates an upstream grant map that grants time slots to the ONTs based on the determined amount of upstream data. The interface transmits the upstream grant map downstream to the ONTs.

42 Claims, 4 Drawing Sheets

SCHEDULING DELIVERY OF UPSTREAM TRAFFIC BASED ON DOWNSTREAM TRAFFIC IN OPTICAL NETWORKS

TECHNICAL FIELD

The disclosure relates to electronic scheduling of upstream traffic from multiple network devices on a shared telecommunication medium.

BACKGROUND

An optical network, such as a passive optical network (PON) as an example, often delivers voice, video and/or other data among multiple network nodes. In the case of a PON, the network nodes are often referred to as optical network terminals (ONTs). The PON can deliver data among multiple ONTs using a common optical fiber link. Passive optical splitters and combiners enable multiple ONTs to share the optical fiber link. An optical line terminal (OLT) transmits information downstream to the ONTs, and receives information transmitted upstream from the ONTs. Each ONT terminates the optical fiber link for a residential or business subscriber, and is sometimes referred to as a subscriber or customer premises node.

Each ONT is connected to one or more customer premises equipment (CPE) devices, which ultimately receive the voice, video and other data delivered via the PON. Examples of CPE devices include computers, telephones, television set-top boxes or the like. An ONT on a PON may receive traffic from several sources. Some sources may be commonly used among several ONTs on a PON. For example, several ONTs may access a common traffic flow associated with switched digital video (SDV) or other multicast streams. Other sources may produce traffic flows that are unique to an individual ONT. For example, an individual ONT may receive web content from an Internet service provider (ISP) or voice data from the public switched telephone network (PSTN).

To schedule delivery of data, such as requests for data stored on a server located in a public network, upstream from ONTs to OLTs over the shared or common optical fiber link, the OLT maintains a scheduler that grants each of the ONTs to which it connects (or, more specifically, so-called traffic containers or "T-conts" storing packets within each of the ONTs) a time slot during which each of the ONTs may transmit their respective upstream data to the OLT. In order to schedule these grants, the OLT may determine how much data each of the ONTs has to transmit upstream. In some instances, the OLT may issue a request to the ONTs for a report of how much data is stored to each of its one or more upstream queues. Those ONTs that support this form of status reporting may respond with an approximate amount of how much data is stored to these one or more upstream queues. For those ONTs that do not support status reporting, the OLT may grant each of these ONTs a set amount of time to transmit upstream and then monitor the amount of traffic sent upstream by these ONTs during their granted set amounts of time. However, in monitoring upstream traffic, the OLT may not proactively schedule time slots to accommodate the upstream data waiting at the monitored ONTs. Instead, the OLT may react to the data sent upstream by these ONTs that do not support status reporting. In this reactive mode, the OLT may fail to schedule an adequate number of time slots to accommodate the amount of data waiting to be sent upstream by the monitored ONTs, which may hamper network operation in certain instances.

In any event, based on the reported status and/or the monitored status, the OLT may determine an upstream grant map that grants each of these ONTs one or more time slots during which these ONTs may transmit upstream data to the OLT. The OLT may generate this upstream grant map in a manner that accommodates different levels of service and past delivery of service using, for example, a weighted round robin or weighted fair queueing algorithm. Typically, the OLT determines this upstream grant map after each scheduling round, which is typically a set period of time during which the OLT may receive status reports from or after determining a monitored amount of data to be transmitted by the ONTs. The OLT determines this grant map at the end of each scheduling round as the OLT may not otherwise have enough information to schedule time slots appropriately for each of the ONTs. The period of time during which the OLT has to determine this grant map after receiving the status reports during any given scheduling round and monitoring upstream data before the grant map has to be sent downstream to the ONTs is, for example, approximately 125 micro seconds (μs) in a gigabit PON (GPON). Considering that the OLT also takes into consideration different levels of service and past delivery of service, computing this grant map in this limited amount of time may require significant resources in terms of processing power and storage capacity.

SUMMARY

In general, this disclosure describes techniques that provide a grant scheduler for an OLT that may pre-compute certain aspects required to determine the upstream grant map so as to reduce the requirements for processing power and storage capacity in comparison to conventional implementations. In accordance with these techniques, the OLT may convert upstream data amounts either reported by status-reporting-enabled ONTs or monitored by the OLT into grant cycles pending (GCPs) without waiting to receive all of the other status reports and/or determine the monitored data amounts for those ONTs that do not support status reporting. By pre-computing the GCPs as these upstream data amounts are received and/or determined, the OLT may reduce the number of computations that need be performed that are tangentially unrelated to generating the grant map, such as converting upstream data amounts to time slots, during the grant map generation period of time between receiving status reports or monitoring the last ONT and sending the upstream grant map downstream to the ONTs (which is commonly a time period of approximately 125 μs, as noted above).

By removing at least partially the conversion of data amounts into time slots through the conversion of data amounts into GCPs before the grant map generation time period, the OLT may then perform more computations during the grant map generation time period that may be considered more directly related to actual grant map generation, such as allocating time slots for ONTs based on the GCPs. In this manner, the techniques may enable the OLT to perform more iterations allocating time slots to ONTs during the grant map generation time period, which may result in better scheduling results as measured in terms of fair bandwidth allocation while also reducing burst sizes and latency considering that more bandwidth may be scheduled in comparison to conventional systems that both convert data amounts into time slots and allocate time slots during the grant map generation time period.

Moreover, techniques are described to better monitor those ONTs that do not support status reporting so as to improve OLT scheduling of monitored ONTs. These monitoring techniques may involve monitoring traffic sent downstream to these monitored ONTs. In response to detecting a marked increase in bandwidth usage by one of these monitored ONTs, the OLT then, in accordance with the techniques, allocates one or more additional grant cycles pending to that monitored ONT proactively, thereby improving grant response times in certain instances. The allocation of the number of additional grant cycles pending may be based on the extent of the increase in downstream bandwidth usage. While these techniques may be most beneficial for allocating upstream bandwidth to those ONTs that do not support status reporting, the techniques may also be applied with respect to those ONTs that do support status reporting to further improve grant response times in certain instances.

In one example, a method comprises determining, with an optical line terminal (OLT) coupled to a plurality of optical network terminals (ONTs) that facilitate the transfer of data between a corresponding one of a plurality of customer network devices and the OLT, an amount of upstream data associated with a category of service that is waiting at a first one of the plurality of ONTs to be transmitted upstream to the OLT and computing a number of grant cycles pending (GCPs) with the OLT based on the determined amount of data associated with the category of service that is waiting at the first one of plurality of ONTs to be transmitted upstream to the OLT. The method also comprises computing a number of GCPs for each of the plurality of ONTs based on a determined amount of data associated with the category of service that is waiting to be transmitted upstream to the OLT for each of the plurality of ONTs and, after computing the number of GCPs for each of the plurality of ONTs, granting time slots to the one or more of the plurality of ONTs based on the number of GCPs computed for each of the plurality of ONTs, wherein the time slots comprise time slots for upstream communication form the ONTs to the OLT.

In another example, an optical line terminal (OLT) couples to a plurality of optical network terminals (ONTs) that facilitate the transfer of data between a corresponding one of a plurality of customer network devices and the OLT. The OLT comprises a control unit that determines an amount of upstream data associated with a category of service that is waiting at a first one of the plurality of ONTs to be transmitted upstream to the OLT, computing a number of GCPs for each of the plurality of ONTs based on a determined amount of data associated with the category of service that is waiting to be transmitted upstream to the OLT for each of the plurality of ONTs and, after computing the number of GCPs for each of the plurality of ONTs, grants time slots to the one or more of the plurality of ONTs based on the number of GCPs computed for each of the plurality of ONTs, wherein the time slots comprise time slots for upstream communication form the ONTs to the OLT.

In another example, a network system comprises a plurality of customer network devices and a passive optical network (PON). The PON comprises an optical line terminal (OLT) and a plurality of optical network terminals (ONTs) that facilitate the transfer of data between a corresponding one of the plurality of customer network devices and the OLT. The OLT comprises a control unit that determines an amount of upstream data associated with a category of service that is waiting at a first one of the plurality of ONTs to be transmitted upstream to the OLT, computes a number of grant cycles pending (GCPs) with the OLT based on the determined amount of data associated with the category of service that is waiting at the first one of plurality of ONTs to be transmitted upstream to the OLT, computing a number of GCPs for each of the plurality of ONTs based on the determined amount of data associated with the category of service that is waiting to be transmitted upstream to the OLT for each of the plurality of ONTs and, after computing the number of GCPs for each of the plurality of ONTs, grants time slots to the one or more of the plurality of ONTs based on the number of GCPs computed for each of the plurality of ONTs, wherein the time slots comprise time slots for upstream communication form the ONTs to the OLT.

In another example, a non-transitory computer-readable medium comprising instructions that, when executed, cause one or more processors to determine, with an optical line terminal (OLT) coupled to a plurality of optical network terminals (ONTs) that facilitate the transfer of data between a corresponding one of a plurality of customer network devices and the OLT, an amount of upstream data associated with the category of service that is waiting at a first one of the plurality of ONTs to be transmitted upstream to the OLT, compute a number of grant cycles pending (GCPs) with the OLT based on the determined amount of data associated with the category of service that is waiting at the first one of plurality of ONTs to be transmitted upstream to the OLT, compute a number of GCPs for each of the plurality of ONTs based on the determined amount of data associated with the category of service that is waiting to be transmitted upstream to the OLT for each of the plurality of ONTs and, after computing the number of GCPs for each of the plurality of ONTs, grant time slots to the one or more of the plurality of ONTs based on the number of GCPs computed for each of the plurality of ONTs, wherein the time slots comprise time slots for upstream communication form the ONTs to the OLT.

In another example, a method comprises determining, with an optical line terminal (OLT) coupled to a plurality of optical network terminals (ONTs) that facilitate the transfer of data between a corresponding one of a plurality of customer network devices and the OLT, an amount of upstream data that is waiting at one of the plurality of ONTs to be transmitted upstream to the OLT and determining, with the OLT, an amount of downstream data that is transmitted by the OLT to the one of the plurality of ONTs. The method also comprises increasing the determined amount of upstream data based on the determined amount of downstream data that is transmitted by the OLT to the one of the plurality of ONTs, after increasing the determined amount of upstream data, generating an upstream grant map that grants time slots to the one or more of the plurality of ONTs based on the amount of upstream data determined for each of the plurality of ONTs and transmitting, with the OLT, the upstream grant map downstream to the plurality of ONTs.

In another example, an optical line terminal (OLT) couples to a plurality of optical network terminals (ONTs) that facilitate the transfer of data between a corresponding one of a plurality of customer network devices and the OLT. The OLT comprises a control unit that determines an amount of upstream data that is waiting at one of the plurality of ONTs to be transmitted upstream to the OLT, determines an amount of downstream data that is transmitted by the OLT to the one of the plurality of ONTs, increases the determined amount of upstream data based on the determined amount of downstream data transmitted by the OLT to the one of the plurality of ONTs and after increasing the determined amount of upstream data, generating an upstream grant map that grants time slots to the one or more of the plurality of ONTs based on the amount of upstream data determined for each of the plurality of ONTs. The OLT also comprises at least one interface that transmits the upstream grant map downstream to the plurality of ONTs.

In another example, a network system comprises a plurality of customer network devices and a passive optical network (PON). The PON comprises an optical line terminal (OLT)

and a plurality of optical network terminals (ONTs) that facilitate the transfer of data between a corresponding one of the plurality of customer network devices and the OLT. The OLT comprises a control unit that determines an amount of upstream data that is waiting at one of the plurality of ONTs to be transmitted upstream to the OLT, determines an amount of downstream data that is transmitted by the OLT to the one of the plurality of ONTs, increases the determined amount of upstream data based on the determined amount of downstream data transmitted by the OLT to the one of the plurality of ONTs and after increasing the determined amount of upstream data, generating an upstream grant map that grants time slots to the one or more of the plurality of ONTs based on the amount of upstream data determined for each of the plurality of ONTs. The OLT also comprises at least one interface that transmits the upstream grant map downstream to the plurality of ONTs.

In another example, a non-transitory computer-readable medium comprising instructions that, when executed, cause one or more processors to determine, with an optical line terminal (OLT) coupled to a plurality of optical network terminals (ONTs) that facilitate the transfer of data between a corresponding one of a plurality of customer network devices and the OLT, an amount of upstream data that is waiting at one of the plurality of ONTs to be transmitted upstream to the OLT, determine, with the OLT, an amount of downstream data that is transmitted by the OLT to the one of the plurality of ONTs, increase the determined amount of upstream data based on the determined amount of downstream data transmitted by the OLT to the one of the plurality of ONTs, after increasing the determined amount of upstream data, generate an upstream grant map that grants time slots to the one or more of the plurality of ONTs based on the amount of upstream data determined for each of the plurality of ONTs and transmit, with the OLT, the upstream grant map downstream to the plurality of ONTs.

The details of one or more examples of the techniques are set forth in the accompanying drawings and the description below. Other features, objects, and advantages of the techniques will be apparent from the description and drawings, and from the claims.

DETAILED DESCRIPTION

In general, this disclosure describes techniques that provide a grant scheduler for an OLT that may pre-compute certain aspects required to determine the upstream grant map so as to reduce the requirements for processing power and storage capacity in comparison to conventional implementations. In accordance with these techniques, the OLT may convert upstream data amounts either reported by status-reporting-enabled ONTs or monitored by the OLT into grant cycles pending (GCPs) without waiting to receive all of the other status reports and/or determine the monitored data amounts for those ONTs that do not support status reporting. By pre-computing the GCPs as these upstream data amounts are received and/or determined, the OLT may reduce the number of computations that need be performed during the grant map generation period of time between receiving the last status report or monitoring the last ONT and sending the upstream grant map downstream to the ONTs (which is commonly a time period of approximately 125 µs, as noted above).

During this 125 µs time period, which may be referred to generally as a "grant map generation time period," the OLT may then only need generate the grant map from the pre-computed GCPs rather than both transform the data values to the equivalent of grant cycles and then generate the grant map from these grant cycles, as is common in conventional systems. While described as a two-step sequential process, during the grant map generation time period, the OLT may continue to convert data amounts into GCPs, updating existing GCPs with the computed amount of GCPs. In effect, the techniques may enable computation of GCPs in a manner that is independent from the grant map generation time period. By pre-computing these GCPs, the techniques may reduce the number of operations that need to be performed by the OLT during the grant map generation time period as the OLT may not need to both compute the grant cycles and then generate the grant map but only generate the grant map from the GCPs. By reducing the amount of processing power consumed by the OLTs in this manner, the techniques may enable this grant scheduler to be implemented using less processor intensive hardware, such as a field programmable gate array (FGPA), which may be more cost effective in terms of the actual cost and subsequent maintenance and troubleshooting of the OLT.

Moreover, techniques are described to better monitor those ONTs that do not support status reporting so as to improve OLT scheduling of monitored ONTs. These monitoring techniques may involve monitoring traffic sent downstream to these monitored ONTs. Typically, flows of traffic are monitored rather than ONTs, however, for purposes of discussion, monitoring of ONTs may include monitoring of flows directed to the ONTs as each flow identifies its destination ONT. In response to detecting a marked increase in bandwidth usage by one of these monitored ONTs, the OLT then, in accordance with the techniques, allocates one or more additional grant cycles pending to that monitored ONT proactively, thereby improving grant response times in certain instances. The allocation of the number of additional grant cycles pending may be based on the extent of the increase in downstream bandwidth usage. While these techniques may be most beneficial for allocating upstream bandwidth to those ONTs that do not support status reporting, the techniques may also be applied with respect to those ONTs that do support status reporting to further improve grant response times in certain instances.

Figure 1:
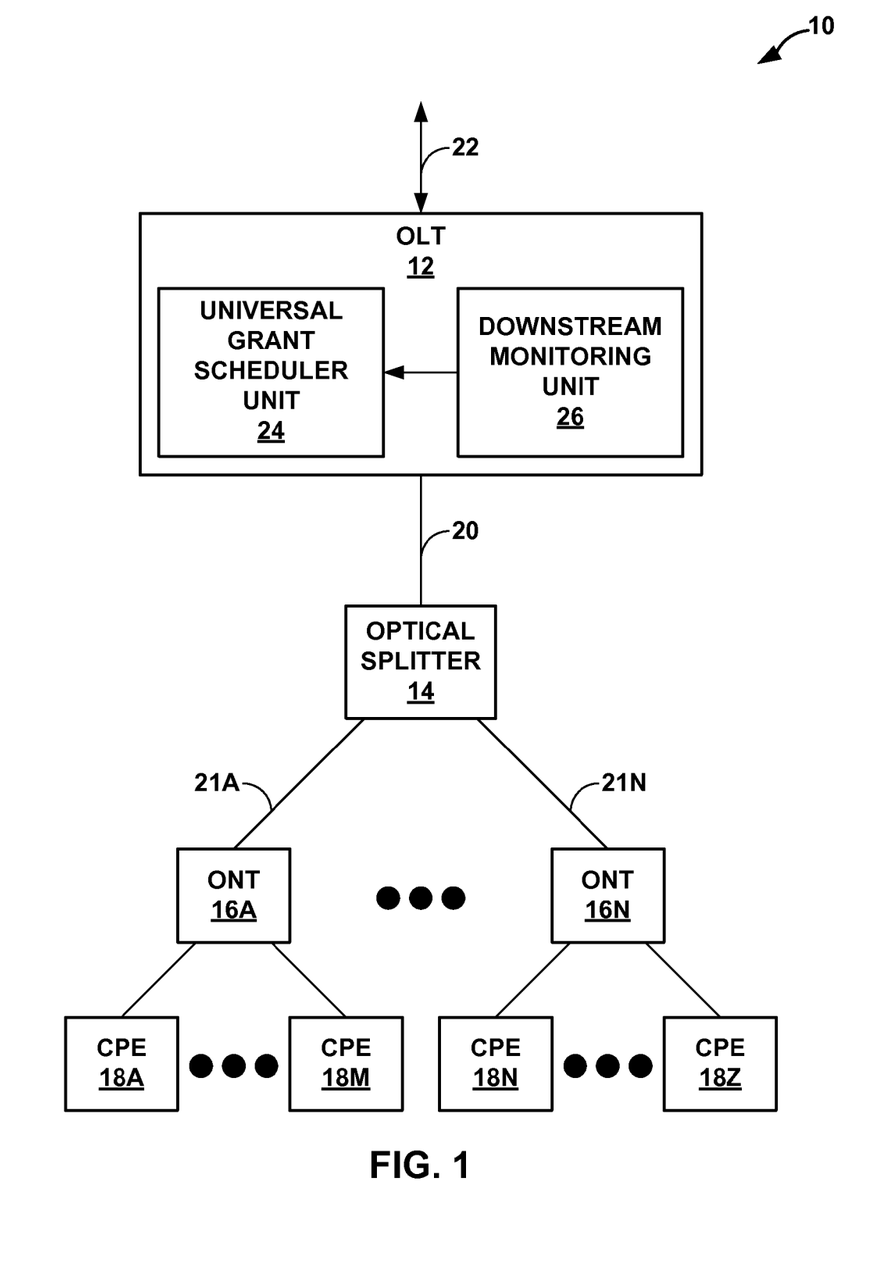
FIG. 1 is a block diagram illustrating a network system including an example of an optical line terminal (OLT) that implements grant scheduling techniques described in this disclosure.

FIG. 1 is a block diagram illustrating a network system 10 including an example of an optical line terminal (OLT) 12 that implements the grant scheduling techniques described in this disclosure. While described in this disclosure with respect to an optical line terminal 12 ("OLT 12"), the techniques may be implemented by any type of network device that schedules upstream grants over a shared medium, such as a PON, a cable modem termination system (CMTS), or other networks.

As shown in the example of FIG. 1, network system 10 includes OLT 12, an optical splitter 14, optical network terminals (ONTs) 16A-16N ("ONTs 16") and customer premises equipment (CPE) 18A-18Z ("CPE 18"). OLT 12 generally represents an optical network device that resides in a central office of a service provider and serves as a point of origination for fiber-to-the-premises (FTTP) transmissions. OLT 12 generally performs operations to maintain connectivity and schedule data transmissions between OLT 12 and ONTs 16. OLT 12 may, for example, perform auto-discovery to discover new ONTs 16, range ONTs 16 to adjust data transmissions to reduce conflicts, schedule upstream data transmission from ONTs 16 to OLT 12, and otherwise manage fiber line 20 coupling OLT 12 to each of ONTs 16.

Optical splitter 14 represents a device that splits an optical signal into two or more copies of the optical signal. In other instances, optical splitter 14 represents a device that splits an optical signal composed of a number of different wavelengths into at least two different optical signals that each has a different subset of the wavelengths. Optical splitter 14 is presumed to be a passive optical splitter that merely splits an optical signal into two or more copies or replicas of the optical signal. In effect, optical splitter 14 splits optical signals sent over optical line 20 into a number of different sub-signals so that these sub-signals can be sent via optical fiber lines 21A-21N ("optical fiber lines 21" or "optical lines 21").

OLT 12 generally includes one physical interface to service a number of ONTs, such as ONTs 16, where OLT 12 multiplexes a number of different optical signals of different wavelengths into a single optical signal that can be sent via the single physical interface to optical fiber line 20. Optical splitter 14, in this context, serves to copy the multiplexed optical signal and relay a copy of each of the optical signals to each one of ONTs 16, where this copying is commonly referred to as "splitting." This splitting, however, does not involve any active switching, but instead merely refers to creating a copy of any given optical signal and sending a copy of this signal to each of ONTs 16. Optical splitter 14, while referred to as a splitter, may also include a combiner that combines the various optical signal sent upstream from ONTs 16 to OLTs 12 into a single optical signal. Optical splitter 14 is commonly not powered and, as a result, may be referred to as "passive" both because it is not powered and because it does not actively route or switch optical signals.

Each of ONTs 16 represents an optical network device that terminates a corresponding one of optical fiber lines 21. ONTs 16 receive their corresponding optical signals and further demultiplex these signals into different component parts, such as a voice component, a video component and a data component. ONTs 16 then forward these different components via various subscriber networks (which, in this case, may include a voice, video and data network or some combination thereof) to CPE 18. CPE 18 each represents any device capable of receiving and processing the different components of the optical signal, such as a set-top box (STB), a digital recorder, a personal media player (PMP), a cellular phone (including so-called "smart phones"), a voice over Internet protocol (VoIP) telephone, an ordinary plain-old telephone system (POTS) phone, a television, a wireless network enabled television, a desktop computer, a laptop computer, a so-called "netbook," a personal digital assistant (PDA), a server, a workstation, a wireless access point (WAP), a hub, and a switch. CPE 18 receives these different components of the optical signal and presents these varying components for consumption by customers that own and operate CPE 18.

As noted above, each of CPE 18 typically receives a copy of every optical signal sent downstream from OLT 12 to any one of CPE 18, as link 20 is shared by CPE 18 and optical splitter 14 does not actively switch or router these optical signals. Given the large amount of bandwidth provided by optical networks systems, such as network system 20 shown in the example of FIG. 1, this form of passive networking that involves replication or copying was widely adopted for its ease of maintenance and low cost. This passive form of data distribution is typically considered "easy to maintain" in that optical splitter 14 is not powered and does not require any extensive configuration. Typically, optical splitter 14 is installed in a post or other outside plant enclosure near the customer premises by inserting this splitter 14 in the enclosure and coupling splitter 14 to the proper links. Once properly inserted and coupled, little if any other configuration is required for optical splitter 14 to begin properly "splitting" or copying the optical signals on a passive basis.

The passive form of network is lower in cost than actively switching networks because it does not require power, which can be costly when having to power hundreds if not thousands of active switches. Moreover, un-powered devices, such as passive splitter 14, may be, as noted above, easier to maintain, leading to lower maintenance associated costs over comparable active optical networks. For this reason, passive optical networks were widely deployed by service provider networks to provide so-called "triple-play" package (involving delivery of a combined package of video, data and voice services) to subscribers.

In contrast to downstream communications from OLT 12 to ONTs 16 where all such downstream communications are combined over shared link 22 and then replicated to each of ONTs 16, upstream communications from ONTs 16 to OLT 12 are managed by OLT 12 through implementation of a downstream bandwidth allocation (DBA) algorithm. Initially, service provider networks deployed basic OLT and ONTs that implemented basic DBA algorithms. For example, OLT 12 assigned time slots to ONTs 16 during which the ONTs 16 may communicate upstream based solely on the service agreement between the customer associated with each of ONTs 16 and the service provider. Typically, OLT 12 implemented a static table identifying a subscribed-to amount of bandwidth for each of the services to which each ONT 16 subscribed regardless of whether the customer actually utilized this assigned upstream bandwidth. These time slots may be variable-sized time slots or fixed-sized time slots, although commonly, OLT 12 allocates variable-sized time slots in the manner defined by the GPON or other PON standards.

As data services grew in adoption (with the notable almost exponential surge in Internet data traffic on a yearly basis) and more data that was commonly provided via different communication media converging with the offering of triple-play packages, the generous amount of upstream bandwidth offered by passive optical networks was consumed by bursty requests for Internet traffic during certain periods of the day, e.g., such as when consumers arrived home from work or when they got up in the morning. Not wanting to increase the outlay of additional fiber links and deployment of additional OLTs and ONTs to satisfy this relatively bursty and often periodic upstream bandwidth consumption, service providers sought ways to oversubscribe the network while still satisfying minimum bandwidth requirements for services specified in subscription contracts (which are also often referred to as "service agreements") with consumers. Responding to this request, optical network device manufactures soon provided updated OLTs and ONTs that implemented more advanced DBA algorithms. While this is commonly considered the reasons optical network device manufactures provided these updated OLTs and ONT, there are any number of other reasons and context for developing updated OLTs and ONTs. The above is provided merely for context and should not be considered to limit the techniques described in this disclosure in any way.

For example, some PON standards, such as the GPON standard set forth in a standard identified as an International Telecommunication Union (ITU) Telecommunication Standardization Sector (ITU-T) G984.2 standard, began introducing a more advanced DBA algorithm that specified a way of polling or querying ONTs for an approximate amount of data waiting to be sent upstream to the OLT. In response to this query, the ONTs issued status reports indicating the approximate amount of data waiting to be sent upstream to the OLTs for a given traffic container (or "T-CONT"). The term "traffic container" generally refers to any container for storing upstream data (such as a buffer, memory, virtual memory, virtual buffer, cache or the like). Typically, T-CONTs are provided for each of the data, voice and television services as well as for other special traffic and may represent a way to differentiate different types of traffic that have different service classes. In any event, this status reporting form of DBA enables OLTs to actively determine an amount of data waiting to be sent upstream for each of its ONTs and then proactively assign or grant time slots to each of the ONTs so as to accommodate oversubscription of shared links, such as link 22.

To illustrate, assuming OLT 12 implements this more advanced form of status reporting (SR) DBA, OTL 12 may poll ONTs 16 and receive status reports from each of ONTs 16 regarding an approximation of a current amount of data waiting to be sent upstream to OLT 12. In this example, it is also assumed that half of ONTs 16 have data waiting to be sent upstream to OLT 12 while the other half of ONTs 16 do not have data waiting to be sent upstream to OLT 12. Collectively, ONTs 16 may be entitled to more upstream bandwidth than that physically capable of being provided by shared link 22, which results in oversubscription of shared link 22. Yet, considering that this upstream traffic is bursty in nature, shared link 22 may accommodate approximately two thirds of ONTs 16 at any one time when providing ONTs 16 with their maximum upstream bandwidth to which they are entitled under the service agreement. Without SR DBA, OLT 12 may inefficiently allocate bandwidth to the half of ONTs 16 that do not have data waiting to be sent upstream to OLT 12. By polling these ONTs 16, however, OLT 12 may more accurately grant upstream time slots to only the half of ONTs 16 that actually have data waiting to be sent upstream to OLT 12. In this manner, SR DBA accommodates oversubscription of shared link 22.

While SR DBA provides many benefits in terms of granting upstream bandwidth, often legacy ONTs are deployed by service providers alongside these more advanced forms of ONTs. To provide a similar form of DBA with respect to these legacy ONTs, OLTs were deployed or upgraded to support a form of DBA referred to as traffic monitoring DBA. In traffic monitoring DBA, the OLT initially grants these upstream time slots (which refer to time slots during which these legacy ONTs may transmit data upstream to the OLT) in accordance with their service agreements. The OLT then monitors the transmission of data during each of these granted upstream time slots to determine whether each ONT has any data to transmit upstream, and, if they have data to send upstream, how much data was sent. The OLT then maintains a table or other data structure to store this historical upstream data transmission information. Going forward, the OLT refers to this table when granting upstream time slots to the ONTs. ONTs may additionally request upstream time slots in this implementation so as to provoke a monitoring session and thereby gain access to additional time slots. Alternatively, the OLT may periodically grant each of the ONTs an upstream time slot to enable this monitoring and data collection.

Such a traffic monitoring DBA may suffer, however, in certain instances or contexts due to the reactive nature of traffic monitoring DBA. That is, this traffic monitoring DBA may be considered "reactive" in that the OLT only learns of upstream data waiting to be sent by the ONT after some data has been sent by that ONT and then reacts to this data to assign the ONT more upstream time slots if the ONT fully utilizes the previously assigned time slots. Such reactive scheduling of upstream bandwidth may result in scheduling increasingly more upstream time slots for an ONT that has a lot of upstream data waiting to be sent to the OLT, which may result in inefficiencies in certain contexts.

For example, when a protocol by which this data is to be sent includes some bandwidth limiting or windowing mechanism that determines a number of packets that may be sent prior to receiving an acknowledgement based on a time to respond to downstream data packets sent by the other device terminating the session (such as a transmission control protocol or TCP), the reactive nature of traffic monitoring DBA may result in a grant time that delays transmission of upstream data to the extent that these protocols impose a what limit on the number of packets that may be sent via the windowing mechanism. The OLT then monitors this ONT, noting that the ONT is only transmitting during a portion of granted time slots (due to the TCP packet limit), whereupon the OLT then allocates less time slots despite the fact that this ONT may still have large amounts of data waiting to be sent. As the OLT continues to send this data, TCP may enlarge the number of packets that may be sent (which may be referred to as a "window"), whereupon the OLT may then assign more time slots. This process may continue with TCP expanding while the OLT contracts bandwidth allocations, resulting in bandwidth utilization inefficiencies.

In any event, OLTs typically schedule those ONTs that implement SR DBA separately from those ONTs that do not support SR DBA, as these different grant scheduling algorithms are typically implemented differently and rely on different scheduling periods. Moreover, when performing traffic monitoring, the OLT may behave reactively, as noted above. When performing SR DBA, however, the OLT may be considered to act proactively in that the OLT learns of this data before it is sent and may adjust the number of time slots granted accordingly. This fragmented treatment to scheduling grants of upstream time slots often results in overly complicated scheduling algorithms. Often, when attempting to schedule these ONTs collectively, the OLT may provide disjointed treatment of ONTs depending on whether they support SR DBA or not, resulting in varying degrees of service for different customers despite the fact that these different customers may subscribe to the same type and level of service.

In addition, when implemented within the same scheduler, the grant scheduler of the OLT usually waits until a scheduling round (during which the OLT may receive data identifying an amount of data to be transmitted upstream from each ONT to which the OLT connects and/or monitor upstream data communications from the ONT) has completed prior to computing the grant map that allocates the upstream time slots to the OLTs during the upcoming upstream transmission period. The grant scheduler waits until the completion of the scheduling round during which it receives or monitors this upstream information as without this information the grant scheduler is unable to adequately assess which of the OLTs require upstream time slots. In the time between the completion of the scheduling round and generating this grant map (which may be approximately 125 microseconds ($\mu$s)), the OLT is required to determine and generate this grant map. Yet, computing this grant map involves a number of different mathematical computations, some of which involve multiplications and/or divisions, which may take many processor cycles to complete.

Moreover, given the dynamic nature of both SR and traffic monitoring DBA in conjunction with the various weights that may be assigned to accommodate different service classes or levels and the necessity of generally meeting the minimum requirements specified in the service contract, the grant scheduler may have to perform a significant number of computations in what may be considered a very short period of time. Typically, implementation of a grant scheduler of this nature involves significant processing resources and/or specifically designed dedicated hardware, such as application specific integrated circuits (ASICs). While such components are not uncommon, these components increase the cost in terms of both initial purchase price and potential maintenance requirements.

Furthermore, various PON standards are frequently being revised or otherwise altered. Given that ASICs are specially designed to implement these standards, changes to these ASICs so as to implement the updated or revised standards are often difficult and may, in some instances, require that completely new ASICs be designed. Given the inflexibility of ASICs to accommodate some PON revisions, ASIC-based OLTs may be expensive to maintain over the life of multiple PON revisions, especially when such revisions require a new ASIC be developed and installed across what may be tens, if not hundreds, of OLTs. ASICs may, therefore, generally be considered inflexible with respect to any changes and result in increased administrative and other maintenance costs. In accordance with the grant scheduling techniques described in this disclosure, OLT 12 includes a universal grant scheduler unit 24 that potentially reduces the number of computations required to be performed during this short period of time between collecting all of the status reports and transmitting the grant map. By reducing the number of computations, universal grant schedule unit 24 may not require the significant hardware resources or specially designed dedicated hardware conventionally required to perform these operations during what is conventionally thought of as the grant map generation period of time between determining the last amount of data to be sent upstream by ONTs 16 and transmitting the grant map, which may reduce costs associated with manufacturing OLT 12.

In some instances, the techniques may reduce the processing requirements during this short period of time post data collection and pre-grant map transmittal such that universal grant scheduler unit 24 may be implemented as programmable hardware, such as a field programmable gate array (FPGA). There are a number of benefits associated with FPGAs including flexibility and rapid prototyping (in comparison to prototyping and development of ASICs), cost in terms of nonrecurring engineering expense (especially in comparison to designing an ASIC), reliability that is on par with dedicated hardware (including ASICs), and long-term maintenance benefits in that FPGAs are field upgradeable to account for changing design requirements.

To reduce the number of computation, universal grant scheduler unit 24 is configured to operate on what is referred to in this disclosure as "grant cycles pending" or "GCPs." GCPs represent an intermediate form of the amount of data waiting to be sent upstream by ONTs 16 in that GCPs represent the number of grant cycles that would be consumed to transmit all of the data waiting to be sent upstream at each of ONTs 16. By converting the data amounts into GCPs for each of ONTs 16, universal grant scheduler unit 24 need not perform this conversion during the grant map generation period of time, thereby significantly reducing the number of operations that need be performed during this shortened grant map generation period of time. This form of abstraction from amounts of data to GCPs hides the underlying DBA algorithm employed to learn of these amounts of data from universal grant scheduler unit 24. Instead, universal grant scheduler unit 24 may be considered "universal" in the sense that it can schedule upstream time slot grants without regard to whether ONTs 16 support SR DBA or not. By implementing the techniques described in this disclosure, universal grant scheduler unit 24 may then base the allocation of upstream bandwidth allocation on grant cycles pending, fully unaware of whether these grant cycles pending correspond to traffic monitored, reported data amounts or any other way by which data amounts are reported. By effectively removing the responsibility of collecting this data and converting this data into grant cycles, universal grant scheduler unit 24 may more efficiently generate the grant map.

To illustrate, OLT 12 may first determine an amount of upstream data that is waiting at a first one of ONTs 16 (e.g., ONT 16A) to be transmitted upstream to OLT 12. Typically, OLT 12 determines this amount of data with respect to a category of services, which may include a quality or class of service or any other identifier that identifies a category of service to which this data or traffic may be associated. ONTs 16 may generally store data associated with different categories of service to different queues (or traffic containers as they are commonly abstracted in the optical network context), whereupon OLT 12 may determine the amount of data that is associated with this category of service. In some instances, OLT 12 may determine an amount of data regardless of the category of service.

OLT 12 may determine this amount via traffic monitoring DBA or via status reports sent by ONT 16A to OLT 12 in the manner described above. When performing traffic monitoring DBA, OLT 12 may determine a category of service of monitored traffic by determining a protocol or other aspect of the packets that is associated with different types or categories of service. For example, hypertext transfer protocol (HTTP) traffic is generally identified by an HTTP header and use of Internet Protocol (IP) port 80. OLT 12 may maintain or otherwise store data identifying associations between certain protocol/port pairs and a category of service.

Regardless, OLT 12 may then, prior to determining an amount of data that is waiting at a second one of ONTs 16 (e.g., ONT 16N) to be transmitted upstream to OLT 12, compute a number of grant cycles pending (GCPs) based on the determined amount of data that is waiting at ONTs 16A to be transmitted upstream to the OLT 12. While not shown in the example of FIG. 1 for ease of illustration purposes, OLT 12 may include a translator unit that converts data amounts into GCPs using a conversion formula. The conversion formula may be statically defined or dynamically specified or configurable by a user. This translator of OLT 12 then stores the computed number of GCPs for the ONT 16A to a GCP table, which again is not shown in FIG. 1 for ease of illustration purposes.

In this manner, a portion of the process that is conventionally performed during the short period of time after determining the last amount of data waiting to be sent upstream by ONTs 16 and transmitting the grant map may be performed at least in part prior to this shortened grant map generation period of time. As a result, universal grant scheduler unit 24 may not be required to also convert these amounts of data to grant cycles during this shortened period of time, thereby potentially reducing the number of operations that need be performed during this period of time. Instead, universal grant scheduler unit 24, after the translator stores the computed number of GCPs to the GCP table for each of the plurality of ONTs 16, determines an upstream grant map that grants time slots (which may also be referred to as "grant cycles") to one or more of ONTs 16 based on the computed number of GCPs stored to the GCP table for each of ONTs 16. Universal grant scheduler unit 24 may still implement the weighted round robin algorithm or any other scheduling algorithm only with respect to GCPs instead of amounts of upstream data waiting at ONTs 16 to be sent upstream. Universal grant scheduler 24 then transmits via an interface coupling OLT 12 to link 22 and thereby ONTs 16 the upstream grant map downstream to ONTs 16.

In addition, OLT 12 includes a downstream monitoring unit 26 that may enhance how grant cycles pending are allocated to traffic monitored ones of ONTs 16 in accordance with various aspects of the techniques described in this disclosure. Downstream monitoring unit 26 may represent a unit that monitors downstream traffic (i.e., traffic received by OLT 12 that is destined to one or more of ONTs 16) typically for those of ONTs 16 that do not support SR DBA. However, while described as being typically applied to those ONTs 16 that do not support SR DBA, the techniques may implemented such that downstream monitoring unit 26 monitors traffic for one or more and potentially all of ONTs 16 regardless of whether these ONTs 16 support SR DBA or not.

Downstream monitoring unit 26 may determine which of ONTs 16 to monitor based on some configuration data input by an administrator. Alternatively, downstream monitoring unit 26 may be configured to automatically monitor downstream traffic for those of ONTs 16 that do not respond to a status request that requests an approximate amount of upstream data is waiting to be sent upstream at each of ONTs 16 to OLT 12. The term "automatically" is used in this context to mean that the administrator does not indicate for which of ONTs 16 that downstream monitoring unit 26 is to monitor their downstream traffic. Rather, downstream monitoring unit 26 may automatically determine without being specifically configured by the administrator which of ONTs 16 do not support SR DBA based on status reports received from ONTs 16. Downstream monitoring unit 26 may then generate a list or any other type of data structure defining those of ONTs 16 that did not respond with a status report and monitor those of ONTs 16 specified within the list or other data structure.

Downstream monitoring unit 26 may identify downstream traffic intended for one or more of ONTs 16 based on, for example, a layer two (L2) address associated with ONTs 16 or any other identifier associated with ONTs 16, such as a PON ID, a virtual local area network (VLAN) tag, or a layer three (L3) address. Downstream monitoring unit 26 may maintain a table or other data structure having entries for each of the ONTs 16 for which downstream traffic monitoring has been enabled. To each entry, downstream monitoring unit 26 may store data defining an amount of downstream traffic sent to each of ONTs 16. Periodically or, in some instances, in response to updating an entry, downstream monitoring unit 26 may forward this updated data to the translator unit, which determines a number of additional GCPs for each of these ONTs 16 based on the amount of downstream traffic sent to each of the corresponding ones of ONTs 16. Again, this translator unit may employ a conversion formula or any other mechanism for determining how to convert the amount of downstream traffic into additional GCPs to assign to each of these ONTs 16 for delivery of upstream data to OLT 12. This translator unit may update entries in the GCP table that correspond to each of the downstream monitored ones of ONTs 16 with the additional GCPs so as to allocate additional upstream bandwidth to these ones of ONTs 16.

By attempting to proactively schedule more upstream bandwidth for those of ONTs 16 that do not support SR DBA, the techniques may reduce what may be characterized as the "thrashing" of bandwidth allocation in certain contexts, such as in the TCP windowing context described above. To illustrate, consider the TCP windowing example above, where the OLT fails to grant a time slot in time for the OLT to response to a TCP packet sent by another device that terminates the TCP session. In this example, downstream monitoring unit 12 of OLT 12 may proactively add additional GCPs for those of ONTs 16 receiving downstream data and that do not support SR DBA. Universal grant scheduler unit 24 in this context may then, when generating the grant map, determine that these ones of ONTs 16 have relatively more upstream data waiting to be sent than other ones of ONTs 16, granting these ones of ONTs 16 additional upstream time slots. These ones of ONTs 16 may then respond more quickly to the downstream data, ensuring that the TCP windowing mechanism does not drastically reduce the window (i.e., the number of packets that these ones of ONTs 16 may send in response to an acknowledgement by the other device terminating the TCP session). In this sense, the enhanced traffic monitoring DBA aspects of the techniques set forth in this disclosure may attempt to add a certain amount of proactivity to what is conventionally considered a reactive form of DBA to potentially reduce or possibly eliminate the thrashing of bandwidth allocation in certain contexts.

Although the grant scheduling and downstream monitoring aspects of the techniques are described as being implemented in conjunction with one another, the grant scheduling and downstream monitoring aspects of the techniques may not necessarily be implemented in this manner. In some instances, OLT 12 may implement only the grant scheduling techniques or only the downstream monitoring aspects of the techniques described in this disclosure without implementing the downstream monitoring or grant scheduling aspects of the techniques described in this disclosure. Consequently, while described as being implemented by the same OLT, i.e., OLT 12 in this example, the techniques should not be limited in this respect.

While described in this disclosure generally with respect to passive optical networks (PONs), the techniques described in this disclosure may be implemented with respect to any type of passive optical network, such as a broadband PON (BPON), a gigabyte PON (GPON), an Ethernet PON (EPON), and the like. For example, optical transport system 10 may function in accordance with the giga-bit PON (GPON), baseband PON (BPON), or Ethernet PON (EPON) standards, or other standards. The GPON, BPON, and EPON standards are defined by ITU-T G984.2 and G983.3, ITU-T 983.1, respectively.

Moreover, while the techniques are described in reference to optical network terminals, the techniques may be implemented by any network device capable of terminating an optical link or line and providing data transmitted via the optical link or line to a customer or subscriber network, including an optical network unit (ONU). In some instances, the term ONU is used interchangeably with the term ONU, and the techniques should not be limited to either an ONT or ONU but to any network device capable of terminating an optical link or line and providing data transmitted via the optical link or line to a customer or subscriber network.

Figure 2:
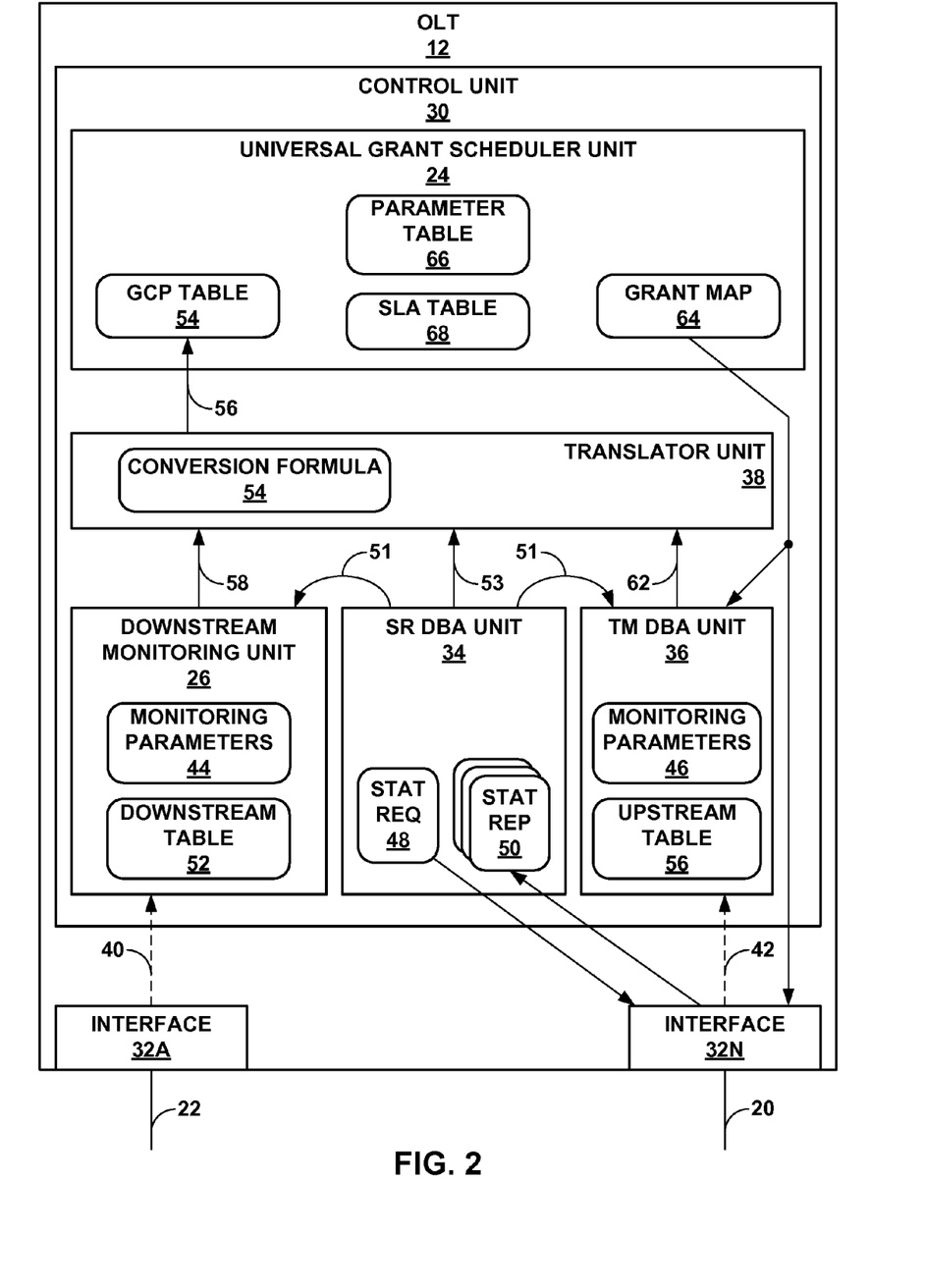
FIG. 2 is a block diagram illustrating the OLT of FIG. 1 in more detail.

FIG. 2 is a block diagram illustrating OLT 12 of FIG. 1 in more detail. In the example of FIG. 2, OLT 12 includes a control unit 30 and interfaces 32A-32N ("interfaces 32").

Control unit 30 may represent one or more processors (not shown in example of FIG. 2) that execute software instructions, such as those used to define a software or computer program, stored to a computer-readable storage medium (again, not shown in the example of FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 30 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each of interfaces 32 represents an interface for interfacing with a physical communication medium, such as an optical fiber link 20 and optical fiber link 22. In the example of FIG. 2, interface 32A is assumed to couple to optical fiber link 22 while interface 32N is assumed to couple to optical fiber link 20. An interface card (IFC) may comprise one or more of interfaces 32, which in this context may be referred to as ports. Each IFC may be inserted into a slot of a chassis that couples to control unit 30 via a backplane or other high-speed interconnection.

Control unit 30 includes universal grant scheduler unit 24 and downstream monitoring unit 26, where were described above with respect to the example of FIG. 1. Universal grant scheduler unit 24 represents a unit that implements the grant scheduling aspects of the techniques described in this disclosure to generate a grant map scheduling time slots during which upstream data may be sent by one or more of ONTs 16 based on grant cycles pending or GCPs rather than actual or approximated data amounts determined to be waiting at ONTs 16 for upstream transmission. Downstream monitoring unit 26 represents a unit that monitors downstream traffic 40 received by ONT 12 via interface 32A over link 22 for delivery to one or more of ONTs 16.

Control unit 30 also includes a status reporting downstream bandwidth allocation (SR DBA) unit 34 ("SR DBA unit 34"), a traffic monitoring (TR) DBA unit 36 ("TM DBA unit 36") and a translator unit 38. SR DBA unit 34 represents a unit that implements SR DBA as specified by any applicable PON standard, such as the GPON standard set forth by the ITU-T G984.2. TM DBA unit 36 represents a unit that monitors upstream traffic 42 received via interface 32 via link 20 from ONTs 16 for one or more of ONTs 16 and generates additional GCPs in accordance with various aspects of the techniques described in this disclosure. Translator unit 38 represents a unit that translates actual or approximate data amounts of traffic waiting upstream (and downstream in instances where both the universal grant and downstream traffic monitoring aspects of the techniques are implemented together) into GCPs.

Initially, an administrator or other user may interface with a user interface presented by a user interface module or unit of control unit 30, which is not shown for ease of illustration purposes. The administrator may configure or otherwise specify monitoring parameters 44 for downstream monitoring unit 26 and monitoring parameters 46 for TM DBA unit 36. Both monitoring parameters 44 and 46 may specify those of ONTs 16 that downstream monitoring unit 26 should monitor or otherwise configure downstream monitoring unit 26 and TM DBA unit 36 to automatically detect those ONTs 16 that do not support SR DBA based on status reports received from ONTs 16, such as status reports 50 ("stat rep 50"), in the manner described above. Monitoring parameters 44 may also define a threshold or other metric to which downstream monitoring unit 26 compares monitored downstream traffic amounts stored to downstream table 52.

Downstream monitoring unit 26 may also store downstream table 52 such that this table 52 includes an entry for each of those ONTs 16 specified by monitoring parameters 44 and/or that do not support SR DBA (as automatically detected based on status reports 50. Each entry stores an amount of data sent downstream to corresponding ones of ONTs 16. Downstream monitoring unit 26 may compare the amount stored to each entry to this threshold and, if the amount exceeds the threshold, downstream monitoring unit 26 may forward this amount to translator unit 38, which effectively adds additional GCPs to an entry in GCP table 54 associated with that one of ONTs 16. If the amount does not exceed the threshold or other configurable or pre-defined metric, downstream monitoring unit 26 continues to monitor downstream traffic 40 and update downstream table 52.

Monitoring parameters 44 may also define a wasting or decay function that downstream monitoring unit 26 may apply to clear or otherwise reduce amounts stored to downstream table 52. Downstream monitoring unit 26 may reduce amounts stored to downstream table 52 as a function of time so that downstream monitoring unit 26 may only report surges in downstream traffic to any given one of ONTs 16 that may require these ones of ONTs 16 to quickly respond so as to avoid thrashing bandwidth allocation when the TCP or other protocols windowing or bandwidth limitation mechanisms interfere with bandwidth allocation by OLT 12.

In any event, once configured, the administrator may enable ONT 12 to begin receiving and forwarding both downstream traffic 40 and upstream traffic 42. Interface 32A may receive downstream traffic and replicate this traffic, forwarding this replicated downstream traffic 40 to downstream monitoring unit 26. Interface 32A may replicate this traffic 40 so that it can forward the original traffic via interface 32N to ONTs 16 while downstream monitoring unit 26 performs its monitoring tasks. Likewise, interface 32N may receive upstream traffic 42 from ONTs 16 and replicate this traffic 42 while sending the original upstream traffic 42 upstream via interface 32A. For this reason, replicated downstream traffic 40 and replicated upstream traffic 42 is shown as a dashed line to indicate that it represents replicated traffic rather than the original traffic, which may be switches or otherwise forwarded upon receipt to reduce latency. Although described with respect to replicated traffic 40, 42, the techniques may be implemented with respect to OLTs that do not replicate traffic but operate on the original traffic. The techniques should therefore not be limited in this respect to the example of FIG. 2.

As noted above, OLT 12 does not schedule transmission of downstream traffic 40 downstream to ONTs 16 considering that link 20 is shared by all of ONTs 16 and therefore each of ONTS 16 receive downstream traffic 40 whether destined for that particular one of ONTs 16 or not. ONTs 16 then filter downstream traffic 40 that is not destined for them typically by performing hardware-level layer two address filtering, such as media access control (MAC) address filtering. Consequently, OLT 12 forwards downstream traffic 40 upon receipt of this traffic 40 unless these time slots during which this downstream traffic is to be forwarded has been reserved for upstream transmissions from ONTs 16 to OLT 12.

In order to schedule these upstream time slots, SR DBA unit 34 may initially issue a status request 48 ("stat req 48") over link 20 via interface 32N to ONTs 16. Those of ONTs 16 that support SR DBA may respond with one of status reports 50. SR DBA unit 34 may parse these status reports 50 to extract an amount of data waiting at the one of ONTs 16 that sent the corresponding one of status reports 50. The amount of data reported may be exact in or approximated. For example, the amount of data may be reported as a number of data blocks, where a block may represent one or more bytes. Thus, if this block is configured to be 4 bytes and an ONT has 42 bytes waiting to be sent upstream, the ONT may report that it has 11 blocks (which the OLT will interpret as 44 bytes) waiting to be sent upstream, which is only an approximate amount of data waiting to be sent upstream as the ONT actually has 42 bytes. Typically, if the amount of data waiting to be sent upstream is small (e.g., smaller than 128 kilobytes (KBs)), those of ONTs 16 that support SR DBA may specify the amount approximately by way of a signaling a number of blocks. However, if the amount of data waiting to be sent upstream is large (e.g., greater than 128 KBs), those of ONTs 16 that support SR DBA may specify a code indicating whether the amount of data waiting to be sent upstream is between 128 KBs and 256 KBs, between 256 KBs and 512 KBs, and so on.

SR DBA unit 34 may forward status reported amounts 53 to translator unit 38, which employs conversion formula 54 to convert status reported amounts 53 into GCP 56. SR DBA unit 34 may also provide a list 51 of those ONTs 16 that do not support SR DBA to downstream monitoring unit 26 and TM DBA unit 36, which may enable these units 26, 36 to determine which of ONTs 16 to monitor when configured to automatically monitor those ONTs 16 that do not support SR DBA. SR DBA unit 34 may determine this list 51 based on status reports 50. For those ONTs 16 that SR DBA unit 34 did not receive one of status reports 50, SR DBA unit 34 may add those ONTs 16 to list 51.

Whether configured to automatically monitor those of ONTs 16 that do not support SR DBA or configured with a list of ONTs 16 to monitor via monitoring parameters 44, downstream monitoring unit 26 may monitor downstream traffic 40, updating downstream table 52 to log the amounts of data sent downstream to each of these monitored ones of ONTs 16. Downstream monitoring unit 26 may periodically or, in response to updating downstream table 52, apply one or more of the above noted thresholds to determine whether to report this downstream data amount for one or more of the monitored ones of ONTs 16.

As noted above, if a downstream data amount stored to downstream table 52 exceeds one of the thresholds, downstream monitoring unit 26 may forward this downstream data amount 58 to translator unit 38 (in instances where both the downstream monitoring and universal grant scheduling aspects of the techniques are implemented in conjunction with one another). Translator 38 applies conversion formula 54 to convert this downstream data amount 58 to GCPs 56, which translator 38 then stores to GCP table 54. If the amounts stored to downstream table 52 do not exceed the threshold, downstream monitoring unit 26 continues to update downstream table 52 based on downstream traffic 40. Downstream monitoring unit 26 may also apply a wasting or decay function to decrement the amounts stored to downstream table 52 periodically as noted above.

Universal grant scheduler unit 24 may, meanwhile, generate an initial grant map 60 allocating each of ONTs 16 (or those of ONTs 16 that are active or otherwise powered on) at least one upstream time slot during which each of ONTs 16 may communicate data upstream. This initial grant map 60 may facilitate upstream bandwidth monitoring performed by TM DBA unit 36. If all of ONTs 16 support SR DBA, then universal grant scheduler unit 24 may forgo this initial grant map 60 and instead generate a grant map 60 that allocates time slots based on GCPs 56 translated from reported data amounts 53 by translator unit 38. Otherwise, if not all of ONTs 16 support SR DBA, this initial grant map 60 that allocates at least one time slot to each of ONTs 16 (assuming that all of ONTs 16 are active) provides TM DBA unit 36 an opportunity to monitor upstream bandwidth transmissions for each of ONTs 16 or, at least, those of ONTs 16 specified by list 51.

TM DBA unit 36 receives this initial grant map 60 and uses this initial grant map 60 to determine when to monitor upstream traffic 42, i.e., which of the upstream time slots correspond to ONTs 16 that do not support SR DBA. Alternatively, TM DBA unit 36 may monitor all upstream traffic 42 without reference to grant map 60. TM DBA unit 36 then monitors upstream traffic 42, logging amounts of data sent upstream to upstream table 56, which may be similar to downstream table 52 only for monitoring upstream traffic 42. TM DBA unit 36 may then report upstream data amounts 62 stored to upstream table 56 after monitoring those ONTs 16 that do not support SR DBA. While described as involving a table 56, the techniques may be implemented such that TM DBA unit 36 merely buffers a data amount for each of ONTs 16 and immediately reports this data amount rather than storing a data amount to a table. Whether stored to a table or not, TM DBA unit 36 forwards upstream data amounts 62 to translator unit 38, which applies conversion formula 54 to these amounts 62 to convert amounts 62 into GCPs 56. Translator unit 38 then stores GCPs 54 for those of ONTs 16 that do not support SR DBA to a corresponding entry of GCP table 54.

As described above, translator unit 38 converts data amounts 53, 58 and 62 to GCPs 56 prior to the grant map generation period of time between receiving the last one of status reports 50 or monitoring and reporting the last one of upstream data amounts 62 and the actual generation of grant map 64. In converting amounts 53, 58 and 62 to GCPs 56 prior to the grant map generation time period, translation unit 38 may effectively reduce the number of operations universal grant scheduler unit 24 need perform during this short grant map generation time period. Translation unit 38 stores these GCPs 56 to GCP table 54.

Universal grant scheduler unit 25 then, during the grant map generation time period, evaluates GCP table 54 in view of parameter table 66 and service level agreement (SLA) table 68 ("SLA table 68"). Parameter table 66 may define a maximum bandwidth supported by link 20 as well as other parameters relevant to the delivery of data via the PON, including a total PON bandwidth available to the DBA scheduler, a grant time overhead (which includes a guard band, preamble and delimiter) and a grant size to use for each OLT (actually, for each traffic container or so-called "T-CONT" provided by each OLT). SLA table 68 may define service level agreements or what may be referred to as "service classes" for various services to which customers may describe. Such service classes may define a maximum permitted bandwidth, minimum guaranteed bandwidth, minimum and maximum latency requirements and other service level metrics that may limit or otherwise define a level of service provided to customers that subscribed to that level of services. SLA table 68 may further specify an association between each of ONTs 16 and one or more SLA agreements, where more than one SLA agreement may be associated to one of ONTs 16 when that ONT delivers more than one service, such as voice, data and video services. Universal grant scheduler unit 24 may implement a round-robin scheduling algorithm, a weighted-roundrobin scheduling algorithm, a deficit round-robin scheduling algorithm or any other type of scheduling algorithm capable of scheduling utilization of a limited resource, which is link 20 in this instance.

To illustrate the generation of grant map 64, universal grant scheduler unit 24 may first access parameter table 66 to determine a total bandwidth that can be provided via link 20. Universal grant scheduler unit 24 may then determine a service level agreement associated with a first one of ONTs 16 by accessing SLA table 68 using what is commonly referred to as an allocation identifier (which is commonly referred to as an "allocID"). An allocID may uniquely identify a traffic container (which is commonly referred to as a "T-cont") of one of ONTs 16. As noted above, ONTs 16 may include one or more traffic containers, such as one for voice, a second for data and a third for video. Downstream monitoring table 52 may associate monitored data amounts 58 with PON identifiers (IDs) in downstream table 52, where each ONT is assigned and associated with a different PON ID. Typically, status requests are sent to each allocID, requesting the amount of data waiting at the associated T-cont and status reports are generated that identify the amount of data waiting at that particular T-cont for transmission upstream.

Likewise, TM DBA unit 36 may associate monitored data amounts 62 with allocIDs. Downstream monitoring unit 26, SR DBA unit 34 and TM DBA unit 36 may report amounts 58, 53 and 62 respectively with their associated allocIDs. Translator unit 38 typically stores the then converted GCPs 56 to entries of GCP table 54 associated with the allocIDs. Universal grant scheduler unit 24 may maintain SLA table 68 by allocID, associating each allocID with a defined service level agreement. Universal grant scheduler 24 may further maintain data with regard to past delivery of services in SLA table 68, such as an amount of data allowed to be sent upstream in a previous upstream time slot, for purposes of determining current provisioning of bandwidth via grant map 64.

Analyzing GCP table 54, universal grant scheduler unit 24 may determine allocIDs that require upstream bandwidth and then analyze SLA table 68 to determine a current amount of bandwidth that should be offered to each of the allocIDs, as well as, to ensure that maximum bandwidth limits are enforced. Universal grant scheduler unit 24 may then schedule the available bandwidth defined by parameter table 66 using one of the above listed scheduling algorithms to allocate one or more GCPs 54 for associated ones of ONTs 16 to time slots defined in grant map 64.

Upon allocating these GCPs 56, universal grant scheduler unit 24 may update GCP table 54 to decrement the number of GCPs 56 stored to entries associated with allocIDs to reflect the grant of a time slot. Each one of GCPs 56 corresponds to a time slot, meaning that if universal grant scheduler unit 24 scheduled three of GCPs 56 for an allocID identifying a T-cont of ONT 16A, for example, universal grant scheduler unit 24 decrements three of GCPs 56 stored to the entry associated with that allocID. Considering that universal grant scheduler unit 24 no longer need convert data amounts to grant cycles or time slots during this grant map generation time period but only assign these GCPs to time slots within grant map 64 according to the implemented scheduling algorithm, universal grant scheduler unit 24 may enable a number of benefits.

First, by utilizing pre-computed (where pre-computed is used herein to refer to the fact that GCPs may be computed without regard to the grant map generation time period and therefore may be generally pre-computed with respect to any given scheduling round) GCPs, universal grant scheduler unit 24 may work on much smaller number representations. Rather than perform mathematical operations with respect to potentially large (in terms of number of bits) representations of the amount of data waiting to be sent upstream at each ONT, universal grant scheduler unit 24 may compute the grant map from GCPs, which represent the amount of data waiting to be sent upstream in a more compact form. Considering that computation times for mathematical operations are generally directly proportional to the size of the data (in terms of bits) to which the mathematical operation is performed, reducing the size of the data to which the mathematical operation is applied may improve the speed with which universal grant scheduler unit 24 may perform these mathematical operations. As a result, universal grant scheduler unit 24 may perform more iterations of this mathematical operation with respect to GCPs in comparison to the actual amount of data reported or monitored, which may improve scheduling accuracy.

Second, use of GCPs may require less storage space, as GCPs represent the amount of data waiting to be sent upstream in a more compact form. Reducing memory requirements to store this amount of data may enable universal grant scheduler unit 24 to implement more GPON MACs in the same amount space as that conventionally used to implement a universal grant scheduler. This reduction in space may also translate into reduced cost and/or more board space for other units.

Third, use of GCPs may enable universal grant scheduler unit 24 to scheduler upstream time slots regardless of the way in which these data amounts are collected, which in effect may unify scheduling. The GCP may, in effect, abstract data amounts from the manner in which these data amounts were collected so as to enable a single universal scheduler to schedule upstream time slots. For example, SR DBA reports data amounts using the representation discussed above, while TR DBA monitors actual amounts sent upstream and downstream monitoring monitors an amount sent downstream. All three of these values may be pertinent for performing upstream time slot allocation, but all three may represent their respective data amounts differently. This different representations require additional operations to be performed so as to enable all three to be scheduled. Rather than perform these operations during the grant map generation time period, the techniques facilitate the abstraction of these representations into a single unifying or universal GCP representation with the added benefits discussed above. By using GCPs, the techniques may leverage common scheduling hardware between what would have been three different scheduling implementations to reduce overall size (in terms of board space by providing one universal scheduler) and also improving performance.

Universal grant scheduler unit 24 may transmit grant map 64 downstream over link 22 via interface 34N to ONTs 16. The process described above may then be repeated only an initial grant map need not be generated and sent. Instead, TM DBA unit 36 may monitor upstream data 42 sent in accordance with grant map 64, providing monitored upstream data amounts 62 to translator unit 38. In some instances, universal grant scheduler unit 24 may prepare a similar sort of initial grant map to give ONTs 16 that previously had no data to send a chance to delivery data upstream. This grant map (which may be referred to as a polling grant map) may be substantially similar to the initial grant map described above and the initial grant map may be considered a polling grant map. In some other instances, rather than poll those of ONTs 16 that do not support SR DBA through a polling grant map, these ones of ONTs 16 may be able to request an upstream time slot through a control channel (which in this context represents a dedicated time reserved over link 22 during which ONTs 16 may communicate control, rather than payload, data to OLT 12).

Figure 3:
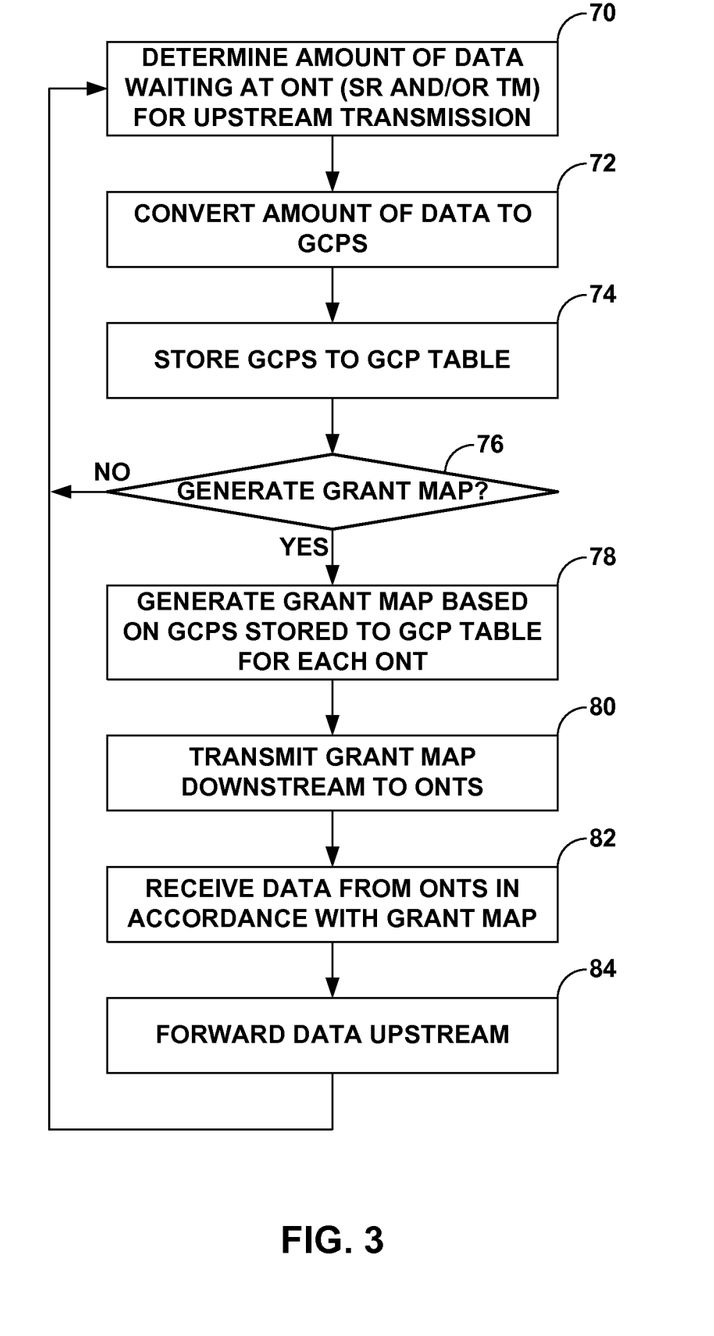
FIG. 3 is a flowchart illustrating exemplary operation of an OLT in implementing universal grant scheduling aspects of the techniques described in this disclosure.

FIG. 3 is a flowchart illustrating exemplary operation of an optical line terminal, such as OLT 12 of FIG. 2, in implementing the universal grant scheduling aspects of the techniques described in this disclosure. Initially, OLT 12 determines an amount of data waiting at ONTs 16 for delivery upstream to OLT 12 in the manner described above (i.e., either using status reporting (SR) and/or traffic monitoring (TM), in this example) (70). That is, control unit 30 of OLT 12 includes SR DBA unit 34 and TM DBA unit 36, where SR DBA unit 34 determines an amount of upstream data 53 waiting at ONTs 16 by sending status request 48 to and receiving status reports 50 from ONTs 16 and TM DBA unit 36 determines an amount of upstream data 62 waiting at ONTs 16 by monitoring upstream data sent during time slots allocated to those ONTs 16 via a previously sent grant map 64.

Regardless of how upstream data amounts 53 and 62 are determined, translator unit 38 converts upstream data amounts 53 and 62 to CGPs 56 in accordance with conversion formula 54, again as described above (72). Translator unit 38 may perform this translation or conversion from data amounts 53 and 62 to corresponding GCPs 56 while still collecting amounts 53, 62 for other ONTs 16 and prior to having to generate the grant map. Translator unit 38 may then store GCPs 56 to corresponding entries of GCP table 54 in the manner described above (74). If time remains before the grant map needs to be generated, meaning that the current scheduling round is not yet complete and it is not time to generate the grant map ("NO" 76), SR DBA unit 34 and TM DBA unit 36 may continue to determine upstream data amounts 53, 62 for those active (in the sense of being powered or otherwise activated) ones of ONTs 16. Translator unit 38 continues to convert these upstream data amounts 53, 62 to GCPs 56 and store these GCPs 56 to CGP table 54 (72, 74). However, if the current scheduling round has completed and it is time to generate the grant map ("YES" 76), universal grant scheduler unit 24 generates grant map 64 based on GCPs 56 stored to GCP table 54 for each active one of ONTs 16 in the manner described above (78). In addition, universal grant scheduler unit 24 may determine or otherwise generate grant map 64 based on parameter table 66 and SLA table 68, as noted above.

While universal grant scheduler unit 24 generates grant map 64, SR DBA unit 34 and TM DBA unit 36 may continue to receive stat reports and monitor upstream data transmission to determine upstream data amounts 53, 62. Thus, while shown in the example of FIG. 3 as if SR DBA unit 34 and TM DBA unit 36 stop monitoring upstream data amounts 53, 62, converting these data amounts to GCPs and storing these GCPs to the GCP table while universal grant scheduler unit 24 generates grant map 64, SR DBA unit 34 and TM DBA unit 36 may continue to determine these data amounts and translator unit 36 may continue convert these data amounts to GCPS and potentially store these GCPS to the GCP table while universal grant scheduler unit 24 generates the grant map. In this respect, the techniques should not be strictly limited to the example of FIG. 3.

In any event, after generating grant map 64, universal grant scheduler unit 24 transmits grant map 64 to ONTs 16 over link 20 via interface 32N (80). Interface 32N then receives upstream data 42 from ONTs 16 in accordance with grant map 64 and forwards upstream data 42 to its destination (often over link 22 via interface 32A to a public network, such as the Internet) (82, 84). The techniques may continue in this manner with TM DBA unit 36 monitoring this upstream data 42 while SR DBA unit 34 polls ONTs 16 for their upstream data amounts 53 by sending a status request 48 and receiving status reports 50 in response to status request 48 (70). Translator unit 36 then converts amounts 53, 62 to GCPs 56, which are stored to GCP table 54 (72, 74). Universal grant scheduler unit 24 may, while SR DBA unit 34 and TM DBA unit 36 may again continue to determine these data amounts and translator unit 36 may continue convert these data amounts to GCPS and potentially store these GCPS to the GCP table, generate another grant map 64 based on GCPs 56 stored to GCP table 54 for each active one of ONTs 16 and transmit grant map 64.

Figure 4:
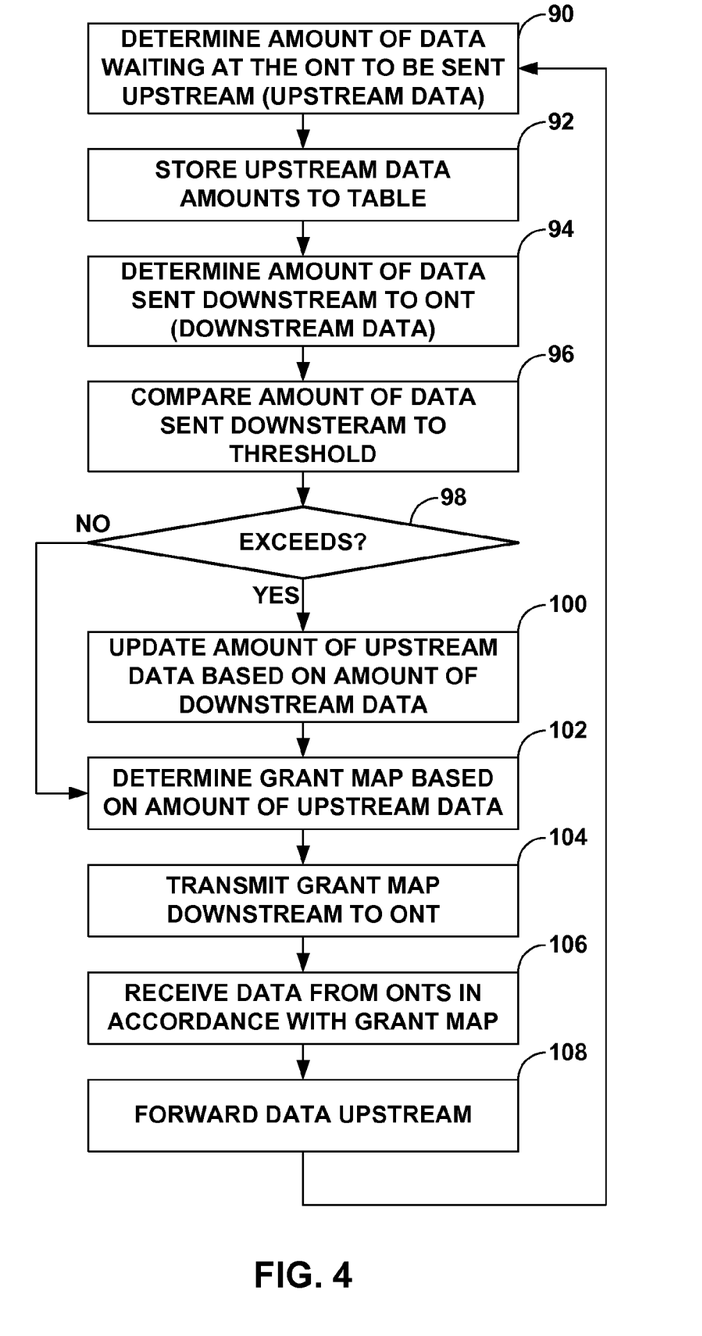
FIG. 4 is a flowchart illustrating exemplary operation of an OLT in implementing downstream traffic monitoring aspects of the techniques described in this disclosure.

FIG. 4 is a flowchart illustrating exemplary operation of an optical line terminal, such as OLT 12 of FIG. 2, in implementing the downstream traffic monitoring aspects of the techniques described in this disclosure. Initially, OLT 12 determines an amount of data waiting at ONTs 16 for delivery upstream to OLT 12 in the manner described above (i.e., either using status reporting (SR) and/or traffic monitoring (TM), in this example) (90). That is, control unit 30 of OLT 12 includes SR DBA unit 34 and TM DBA unit 36, where SR DBA unit 34 determines an amount of upstream data 53 waiting at ONTs 16 by sending status request 48 to and receiving status reports 50 from ONTs 16 and TM DBA unit 36 determines an amount of upstream data 62 waiting at ONTs 16 by monitoring upstream data sent during time slots allocated to those ONTs 16 via a previously sent grant map 64.

Regardless of how upstream data amounts 53 and 62 are determined, SR DBA unit 34 and TM DBA unit 36 store upstream data amounts 53 and 62 to GCP table 54 after being converted, in this example to GCPs 56 in accordance with the universal grant scheduling aspects of the techniques described in this disclosure. While described with respect to the grant scheduling aspects of the techniques, the downstream monitoring aspects of the techniques may be implemented separate from the grant scheduling aspects. In these instances, OLT 12 may store upstream data amounts 53, 62 to a table within a grant scheduler or similar unit that may be similar to GCP table 54 only, instead of storing GCPs, it stores upstream data amounts.

However, assuming the various aspects of the techniques are implemented in conjunction as described in the examples of this disclosure, translator unit 38 converts upstream data amounts 53 and 62 to CGPs 56 in accordance with conversion formula 54, again as described above. Translator unit 38 may perform this translation or conversion from data amounts 53 and 62 to corresponding GCPs 56 while still collecting amounts 53, 62 for other ONTs 16 and prior to determining a last amount 53 or 62 for those active (in the sense of being powered or otherwise activated) ones of ONTs 16. Translator unit 38 may then store GCPs 56 to corresponding entries of GCP table 54 in the manner described above. In this respect, translator unit 38 stores upstream data amounts 53, 62 to GCP table 54 in the form of GCPs 56 (92).

Meanwhile, downstream monitoring unit 26 determines an amount of data 58 sent downstream by OLT 12 to each of active ones of ONTs 16 in the manner described above (94). Downstream monitoring unit 26 may store these downstream data amounts 58 to corresponding entries of downstream table 52. Downstream monitoring unit 26 may then compare downstream data amounts 58 to a threshold or other metric defined as one of monitoring parameters 44 (96). In some instances, rather than compare downstream data amounts 58, downstream monitoring unit 26 may determine a change in downstream data amounts over any given period of time, where the period of time may be configurable or pre-defined. Downstream monitoring unit 26 may then compare this change in downstream data amounts to the threshold or other metric defined as one of monitoring parameters 44.

In any event, if one or more of downstream data amounts 58 or changes in downstream data amounts (which effectively represents a change in the downstream rate of data delivery) exceeds the threshold ("YES" 98), downstream monitoring unit 26 may forward this downstream data amount 58 to translation unit 36, which translates downstream data amounts 58 to one or more GCPs 56. Translation unit 36 then updates an entry of GCP table 54 corresponding to the one of ONTs 16 for which downstream data amount 58 was monitored to increase the number of GCPs 56 assigned to that one of ONTs 16. In this manner, OLT 12 updates an amount of upstream data based on the monitored amount of downstream data (100). Again, while described in this example with respect to GCPs, the downstream monitoring aspects of the techniques set forth in this disclosure may be implemented with respect to data amounts rather than GCPs to potentially reduce latency when implementing conventional or standard grant scheduling algorithms.

If one or more downstream data amounts 58 do (or changes in the downstream data rate of delivery does) not exceed the threshold ("NO" 98) or after updating GCPs 56 stored to GCP table 54 based on downstream data amounts 58, universal grant scheduler unit 24 may generate grant map 64 based on GCPs 56 stored to GCP table 54 for each active one of ONTs 16 (102). In addition, universal grant scheduler unit 24 may determine or otherwise generate grant map 64 based on parameter table 66 and SLA table 68, as noted above. After generating grant map 64, universal grant scheduler unit 24 transmits grant map 64 to ONTs 16 over link 20 via interface 32N (104). Interface 32N then receives upstream data 42 from ONTs 16 in accordance with grant map 64 and forwards upstream data 42 to its destination (often over link 22 via interface 32A to a public network, such as the Internet) (106, 108). The techniques may continue in this manner until such time that OLT 12 is no longer active, powered or otherwise enabled or operational (90-108).

In this way, OLT 12 determines an amount of upstream data that is waiting at one of ONTs 16 to be transmitted upstream to OLT 12 and then determines an amount of downstream data that is transmitted by the OLT to the one of ONTs 16. OLT 12 then increases the determined amount of upstream data based on the determined amount of downstream data is transmitted by OLT 12 to the one of ONTs 16 and, after increasing the determined amount of upstream data, generates an upstream grant map 64 that grants time slots to the one or more of ONTs 16 based on the amount of upstream data determined for each ONTs 16.

OLT 12 then transmits the upstream grant map downstream to ONTs 16, receives upstream data in accordance with upstream grant map and forwards this upstream traffic to its intended destination. By monitoring downstream data amounts and then increasing upstream data amounts based on the monitored downstream amounts, OLT 12 may proactively assign upstream bandwidth to those of ONTs 16 that are likely to require this bandwidth to response to TCP or other windowing protocols that limit the amount of data that can be sent. By proactively assigning this upstream bandwidth, OLT 12 may reduce or, in some instances, prevent bandwidth allocation thrashing whereby both OLT 12 and the underlying protocol each misidentify the reason why ONTs 16 fail to fully utilize their allotted bandwidth and then decrease bandwidth at odds with one another.

The techniques described herein may be implemented in hardware, firmware, or any combination thereof. The hardware may, in some instances, also execute software. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like, including non-transitory computer-readable mediums. The techniques additionally, or alternatively, may be realized at least in part by a transitory computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications.

Various examples have been described. These and other examples are within the scope of the following claims.

The invention claimed is:

1. A method comprising:

determining, with an optical line terminal (OLT) coupled to a plurality of optical network terminals (ONTs) that facilitate the transfer of data between a corresponding one of a plurality of customer network devices and the OLT, an amount of upstream data that is waiting at one of the plurality of ONTs to be transmitted upstream to the OLT;

determining, with the OLT, an amount of downstream data that is transmitted by the OLT to the one of the plurality of ONTs;

increasing the amount of upstream data determined by the OLT to be waiting at the one of the plurality of ONTs to be transmitted upstream to the OLT based on the determined amount of downstream data that is transmitted by the OLT to the one of the plurality of ONTs;

after increasing the determined amount of upstream data determined by the OLT to be waiting at the one of the plurality of ONTs to be transmitted upstream to the OLT, generating an upstream grant map that grants time slots to one or more of the plurality of ONTs based on the increased amount of upstream data determined for the one of the plurality of ONTs and an amount of upstream data determined for each of remaining ones of the plurality of ONTs; and transmitting, with the OLT, the upstream grant map downstream to the plurality of ONTs.

2. The method of claim 1, further comprising determining a change in the amount of downstream data that is transmitted by the OLT to the one of the plurality of ONTs based on the determined amount of downstream data, wherein increasing the amount of upstream data comprises increasing the amount of upstream data determined by the OLT based on the determined change in the amount of downstream data.

3. The method of claim 1, wherein the downstream data comprises data sent downstream in accordance with a protocol able to reduce bandwidth usage.

4. The method of claim 3, wherein the protocol comprises a transmission control protocol (TCP) that is able to reduce bandwidth usage using a windowing mechanism.

5. The method of claim 1, further comprising comparing the determined amount of downstream data to a threshold, wherein increasing the amount of upstream data determined by the OLT comprises, based on the comparison, increasing the amount of upstream data determined by the OLT based on the determined amount of downstream data that is transmitted by the OLT to the one of the plurality of ONTs prior to granting the time slots.

6. The method of claim 1, further comprising, prior to determining an amount of upstream data that is waiting at another one of the plurality of ONTs different from the one of the plurality of ONTs to be transmitted upstream to the OLT and prior to granting time slots to one or more of the plurality of ONTs, computing a number of grant cycles pending (GCPs) with the OLT based on the amount of upstream data determined by the OLT to be waiting at the one of a plurality of ONTs to be transmitted upstream to the OLT, and wherein generating the grant map comprises, after computing a number of GCPs for each of the plurality of ONTs based on a determined amount of data that is waiting to be transmitted upstream to the OLT for each of the plurality of ONTs, generating the grant map to grant the time slots to the one or more of the plurality of ONTs based on the number of GCPs computed for each of the plurality of ONTs.

7. The method of claim 1, further comprising:

receiving upstream data from each of the plurality of ONTs in accordance with the transmitted grant map; and forwarding the upstream data to an intended destination specified by the upstream data.

8. The method of claim 1, wherein determining an amount of upstream data that is waiting at one of the plurality of ONTs to be transmitted upstream to the OLT comprises:

transmitting a status request to the plurality of ONTs;

receiving a status report from the first one of the plurality of ONTs, wherein the status report defines either an exact or an approximate amount of upstream data that is waiting at the first one of the plurality of ONTs to be transmitted upstream to the OLT, and determining the amount of upstream data that is waiting at the first one of the plurality of ONTs to be transmitted upstream to the OLT based on the exact or approximate amount of upstream data defined by the received status report.

9. The method of claim 1, wherein determining an amount of upstream data that is waiting at the one of the plurality of ONTs to be transmitted upstream to the OLT comprises:

determining an amount of data sent upstream by the first one of the OLTs in response to a previously sent grant map granting at least one time slot for a previous period of time during which the first one of the OLTs was to communicate data upstream; and determining the amount of upstream data that is waiting at the first one of the plurality of ONTs to be transmitted upstream to the OLT based on the determined amount of data sent upstream by the first one of the OLTs in response to the previously sent grant map.

10. The method of claim 1, wherein the plurality of ONTs couple to the OLT via a link that is shared by two or more of the ONTs, wherein the ONTs and the OLT reside in a passive optical network (PON), and wherein the link that is shared by the two or more of the ONTs comprises an optical fiber link.

11. An optical line terminal (OLT) coupled to a plurality of optical network terminals (ONTs) that facilitate the transfer of data between a corresponding one of a plurality of customer network devices and the OLT, the OLT comprising:

a control unit that determines an amount of upstream data that is waiting at one of the plurality of ONTs to be transmitted upstream to the OLT, determines an amount of downstream data that is transmitted by the OLT to the one of the plurality of ONTs, increases the amount of upstream data determined by the control unit to be waiting at the one of the plurality of ONTs to be transmitted upstream to the OLT based on the determined amount of downstream data transmitted by the OLT to the one of the plurality of ONTs and, after increasing the amount of upstream data determined by the control unit to be waiting at the one of the plurality of ONTs to be transmitted upstream to the OLT, generates an upstream grant map that grants time slots to the one or more of the plurality of ONTs based on the increased amount of upstream data determined for the one of the plurality of ONTs and an amount of upstream data determined for each of remaining ones of the plurality of ONTs; and at least one interface that transmits the upstream grant map downstream to the plurality of ONTs.

12. The OLT of claim 11, wherein the control unit further determines a change in the amount of downstream data that is transmitted by the OLT to the one of the plurality of ONTs based on the amount of downstream data and increases the amount of upstream data determined by the control unit based on the determined change in the amount of downstream data.

13. The OLT of claim 11, wherein the downstream data comprises data sent downstream in accordance with a protocol able to reduce bandwidth usage.

14. The OLT of claim 13, wherein the protocol comprises a transmission control protocol (TCP) that is able to reduce bandwidth usage using a windowing mechanism.

15. The OLT of claim 11, wherein the control unit further compares the determined amount of downstream data to a threshold and, based on the comparison, increases the amount of upstream data determined by the control unit based on the determined amount of downstream data that is transmitted by the OLT to the one of the plurality of ONTs prior to granting the time slots.

16. The OLT of claim 11, wherein the control unit further, prior to determining an amount of upstream data that is waiting at a another one of the plurality of ONTs different from the one of the plurality of ONTs to be transmitted upstream to the OLT and prior to granting time slots to one or more of the plurality of ONTs, computes a number of grant cycles pending (GCPs) based on the determined amount of upstream data that is waiting at the one of a plurality of ONTs to be transmitted upstream to the OLT and, after computing a number of GCPs for each of the plurality of ONTs based on a determined amount of data that is waiting to be transmitted upstream to the OLT for each of the plurality of ONTs, generates the grant map to grant the time slots to the one or more of the plurality of ONTs based on the number of GCPs computed for each of the plurality of ONTs.

17. The OLT of claim 11, wherein the at least one interface further receives upstream data from each of the plurality of ONTs in accordance with the transmitted grant map and forwards the upstream data to an intended destination specified by the upstream data.

18. The OLT of claim 11,
wherein the at least one interface further transmits a status request to the plurality of ONTs, and receives a status report from the first one of the plurality of ONTs, wherein the status report defines either an exact or an approximate amount of upstream data that is waiting at the first one of the plurality of ONTs to be transmitted upstream to the OLT, and
wherein the control unit further determines the amount of upstream data that is waiting at the first one of the plurality of ONTs to be transmitted upstream to the OLT based on the exact or approximate amount of upstream data defined by the received status report.

19. The OLT of claim 11, wherein the control unit further determines an amount of data sent upstream by the first one of the OLTs in response to a previously sent grant map granting at least one time slot for a previous period of time during which the first one of the OLTs was to communicate data upstream and determines the amount of upstream data that is waiting at the first one of the plurality of ONTs to be transmitted upstream to the OLT based on the determined amount of data sent upstream by the first one of the OLTs in response to the previously sent grant map.

20. The OLT of claim 11,
wherein the plurality of ONTs couple to the OLT via a link that is shared by two or more of the ONTs,
wherein the ONTs and the OLT reside in a passive optical network (PON), and
wherein the link that is shared by the two or more of the ONTs comprises an optical fiber link.

21. The OLT of claim 11, wherein the control unit comprises a field programmable gate array.

22. A network system comprising:
a plurality of customer network devices; and
a passive optical network (PON) comprising:
an optical line terminal (OLT); and
a plurality of optical network terminals (ONTs) that facilitate the transfer of data between a corresponding one of the plurality of customer network devices and the OLT,
wherein the OLT comprises:
a control unit that determines an amount of upstream data that is waiting at one of the plurality of ONTs to be transmitted upstream to the OLT, determines an amount of downstream data that is transmitted by the OLT to the one of the plurality of ONTs, increases the amount of upstream data determined by the control unit to be waiting at the one of the plurality of ONTs to be transmitted upstream to the OLT based on the determined amount of downstream data transmitted by the OLT to the one of the plurality of ONTs and, after increasing the amount of upstream data determined by the control unit to be waiting at the one of the plurality of ONTs to be transmitted upstream to the OLT, generates an upstream grant map that grants time slots to the one or more of the plurality of ONTs based on the increased amount of upstream data determined for the one of the plurality of ONTs and an amount of upstream data determined for each of remaining ones of the plurality of ONTs; and
at least one interface that transmits the upstream grant map downstream to the plurality of ONTs.

23. The network system of claim 22, wherein the control unit further determines a change in the amount of downstream data that is transmitted by the OLT to the one of the plurality of ONTs based on the amount of downstream data and increases the amount of upstream data determined by the control unit based on the determined change in the amount of downstream data.

24. The network system of claim 22, wherein the downstream data comprises data sent downstream in accordance with a protocol able to reduce bandwidth usage.

25. The network system of claim 24, wherein the protocol comprises a transmission control protocol (TCP) that is able to reduce bandwidth usage using a windowing mechanism.

26. The network system of claim 22, wherein the control unit further compares the determined amount of downstream data to a threshold and, based on the comparison, increases the amount of upstream data determined by the control unit based on the determined amount of downstream data that is transmitted by the OLT to the one of the plurality of ONTs prior to granting the time slots.

27. The network system of claim 22, wherein the control unit further, prior to determining an amount of upstream data that is waiting at a another one of the plurality of ONTs different from the one of the plurality of ONTs to be transmitted upstream to the OLT and prior to granting time slots to one or more of the plurality of ONTs, computes a number of grant cycles pending (GCPs) based on the determined amount of upstream data that is waiting at the one of a plurality of ONTs to be transmitted upstream to the OLT and, after computing a number of GCPs for each of the plurality of ONTs based on a determined amount of data that is waiting to be transmitted upstream to the OLT for each of the plurality of ONTs, generates the grant map to grant the time slots to the one or more of the plurality of ONTs based on the number of GCPs computed for each of the plurality of ONTs.

28. The network system of claim 22, wherein the at least one interface further receives upstream data from each of the plurality of ONTs in accordance with the transmitted grant map and forwards the upstream data to an intended destination specified by the upstream data.

29. The network system of claim 22,
wherein the at least one interface further transmits a status request to the plurality of ONTs, and receives a status report from the first one of the plurality of ONTs, wherein the status report defines either an exact or an approximate amount of upstream data that is waiting at the first one of the plurality of ONTs to be transmitted upstream to the OLT, and
wherein the control unit further determines the amount of upstream data that is waiting at the first one of the plurality of ONTs to be transmitted upstream to the OLT based on the exact or approximate amount of upstream data defined by the received status report.

30. The network system of claim 22, wherein the control unit further determines an amount of data sent upstream by the first one of the OLTs in response to a previously sent grant map granting at least one time slot for a previous period of time during which the first one of the OLTs was to communicate data upstream and determines the amount of upstream data that is waiting at the first one of the plurality of ONTs to be transmitted upstream to the OLT based on the determined amount of data sent upstream by the first one of the OLTs in response to the previously sent grant map.

31. The network system of claim 22,
wherein the plurality of ONTs couple to the OLT via a link that is shared by two or more of the ONTs,
wherein the ONTs and the OLT reside in a passive optical network (PON), and
wherein the link that is shared by the two or more of the ONTs comprises an optical fiber link.

32. The network system of claim 22, wherein the control unit comprises a field programmable gate array.

33. A non-transitory computer-readable medium comprising instructions that, when executed, cause one or more processors to:
determine, with an optical line terminal (OLT) coupled to a plurality of optical network terminals (ONTs) that facilitate the transfer of data between a corresponding one of a plurality of customer network devices and the OLT, an amount of upstream data that is waiting at one of the plurality of ONTs to be transmitted upstream to the OLT;
determine, with the OLT, an amount of downstream data that is transmitted by the OLT to the one of the plurality of ONTs;
increase the amount of upstream data determined by the OLT to be waiting at the one of the plurality of ONTs to be transmitted upstream to the OLT based on the determined amount of downstream data transmitted by the OLT to the one of the plurality of ONTs;
after increasing the amount of upstream data determined by the OLT to be waiting at the one of the plurality of ONTs to be transmitted upstream to the OLT, generate an upstream grant map that grants time slots to the one or more of the plurality of ONTs based on the increased amount of upstream data determined for the one of the plurality of ONTs and an amount of upstream data determined for each of remaining ones of the plurality of ONTs; and
transmit, with the OLT, the upstream grant map downstream to the plurality of ONTs.

34. The non-transitory computer-readable medium of claim 33, further comprising instructions that, when executed, cause the one or more processors to:
determine a change in the amount of downstream data that is transmitted by the OLT to the one of the plurality of ONTs based on the determined amount of downstream data; and
increase the amount of upstream data determined by the OLT based on the determined change in the amount of downstream data.

35. The non-transitory computer-readable medium of claim 33, wherein the downstream data comprises data sent downstream in accordance with a protocol able to reduce bandwidth usage.

36. The non-transitory computer-readable medium of claim 35, wherein the protocol comprises a transmission control protocol (TCP) that is able to reduce bandwidth usage using a windowing mechanism.

37. The non-transitory computer-readable medium of claim 33, further comprising instructions that, when executed, cause the one or more processors to:
compare the determined amount of downstream data to a threshold;
based on the comparison, increase the amount of upstream data determined by the OLT based on the determined amount of downstream data that is transmitted by the OLT to the one of the plurality of ONTs prior to granting the time slots.

38. The non-transitory computer-readable medium of claim 33, further comprising instructions that, when executed, cause the one or more processors to:
prior to determining an amount of upstream data that is waiting at a another one of the plurality of ONTs different from the one of the plurality of ONTs to be transmitted upstream to the OLT and prior to granting time slots to one or more of the plurality of ONTs, compute a number of grant cycles pending (GCPs) with the OLT based on the determined amount of upstream data that is waiting at the one of a plurality of ONTs to be transmitted upstream to the OLT; and
after computing a number of GCPs for each of the plurality of ONTs based on a determined amount of data that is waiting to be transmitted upstream to the OLT for each of the plurality of ONTs, generate the grant map to grant the time slots to the one or more of the plurality of ONTs based on the number of GCPs computed for each of the plurality of ONTs.

39. The non-transitory computer-readable medium of claim 33, further comprising instructions that, when executed, cause the one or more processors to:
receive upstream data from each of the plurality of ONTs in accordance with the transmitted grant map; and
forward the upstream data to an intended destination specified by the upstream data.

40. The non-transitory computer-readable medium of claim 33, further comprising instructions that, when executed, cause the one or more processors to:
transmit a status request to the plurality of ONTs;
receive a status report from the first one of the plurality of ONTs, wherein the status report defines either an exact or an approximate amount of upstream data that is waiting at the first one of the plurality of ONTs to be transmitted upstream to the OLT, and
determine the amount of upstream data that is waiting at the first one of the plurality of ONTs to be transmitted upstream to the OLT based on the exact or approximate amount of upstream data defined by the received status report.

41. The non-transitory computer-readable medium of claim 33, further comprising instructions that, when executed, cause the one or more processors to:
determine an amount of data sent upstream by the first one of the OLTs in response to a previously sent grant map granting at least one time slot for a previous period of time during which the first one of the OLTs was to communicate data upstream; and
determine the amount of upstream data that is waiting at the first one of the plurality of ONTs to be transmitted upstream to the OLT based on the determined amount of data sent upstream by the first one of the OLTs in response to the previously sent grant map.

42. The method of claim 1, wherein determining, with the OLT, the amount of downstream data comprises determining, with the OLT, the amount of downstream data that is transmitted by the OLT downstream to the one of the plurality of ONTs such that the amount of downstream data does not include any amounts of downstream data destined for any other one of the plurality of ONTs.

* * * * *